United States Patent
Lee et al.

(10) Patent No.: US 12,370,494 B2
(45) Date of Patent: Jul. 29, 2025

(54) GAS DISPERSION DEVICE FOR IMPROVING PERFORMANCE OF RECTANGULAR SCRUBBER

(71) Applicant: HANBAL MASSTECH LIMITED, Gimhae-si (KR)

(72) Inventors: Sung Won Lee, Gimhae-si (KR); Ki Joon Kang, Ulsan (KR)

(73) Assignee: HANBAL MASSTECH LIMITED, Gimhae-si (KR)

( * ) Notice: Subject to any disclaimer, the term of this patent is extended or adjusted under 35 U.S.C. 154(b) by 178 days.

(21) Appl. No.: 18/024,420

(22) PCT Filed: Oct. 26, 2021

(86) PCT No.: PCT/KR2021/015125
§ 371 (c)(1),
(2) Date: Mar. 2, 2023

(87) PCT Pub. No.: WO2022/092773
PCT Pub. Date: May 5, 2022

(65) Prior Publication Data
US 2023/0364551 A1 Nov. 16, 2023

(30) Foreign Application Priority Data
Oct. 28, 2020 (KR) .......................... 10-2020-0141455

(51) Int. Cl.
*B01D 53/18* (2006.01)
*B01D 47/06* (2006.01)
*B01F 23/21* (2022.01)
*B01F 23/213* (2022.01)

(52) U.S. Cl.
CPC ............. *B01D 53/18* (2013.01); *B01D 47/06* (2013.01); *B01F 23/213* (2022.01); *B01F 23/214* (2022.01)

(58) Field of Classification Search
CPC ....... B01F 23/21; B01F 23/213; B01F 23/214
See application file for complete search history.

(56) References Cited

U.S. PATENT DOCUMENTS 3,895,926 A * 7/1975 Lerner .................. B01D 45/08
261/126

FOREIGN PATENT DOCUMENTS

| JP | 10-030431 A | | 2/1998 |
|---|---|---|---|
| JP | H119955 A | * | 1/1999 |
| JP | 11319491 A | | 11/1999 |
| KR | 10-2016-0060414 A | | 5/2016 |
| KR | 10-1804418 B1 | | 12/2017 |
| KR | 10-2018-0125119 A | | 11/2018 |
| KR | 10-2019-0000275 A | | 1/2019 |
| KR | 10-1940604 B1 | | 1/2019 |
| KR | 10-1998386 B1 | | 7/2019 |
| KR | 10-2019-0099180 A | | 8/2019 |
| KR | 10-2019-0123044 A | | 10/2019 |
| KR | 10-2243508 B1 | | 4/2021 |

* cited by examiner

*Primary Examiner* — Robert A Hopkins
(74) *Attorney, Agent, or Firm* — Bridgeway IP Law Group, PLLC; Sang Ho Lee; Hyun Woo Shin (57) ABSTRACT

A gas dispersion device capable of improving the performance of a rectangular scrubber includes: a scrubber having a rectangular shape; and a gas inlet configured to introduce gas into the scrubber, the gas inlet being mounted on the scrubber and having a rectangular shape.

7 Claims, 8 Drawing Sheets

GAS DISPERSION DEVICE FOR IMPROVING PERFORMANCE OF RECTANGULAR SCRUBBER

TECHNICAL FIELD

The present disclosure relates to a gas dispersion device capable of improving the performance of a rectangular scrubber, and more particularly, to a gas dispersion device which is equipped with a gas inlet and a gas disperser and which may spray gas in a rectangular shape inside a rectangular scrubber to improve the contact efficiency between gas and liquid, thereby efficiently removing harmful substances from the gas.

BACKGROUND ART

In general, devices that burn fuel, such as turbines or heaters used in fertilizer plants, chemical plants, ships, etc., discharge exhaust gases into the atmosphere. Before exhaust gases are discharged into the atmosphere, a scrubber, which is a type of tower, absorbs harmful substances, such as soot and sulfur compounds, and then discharges the exhaust gases into the atmosphere.

The scrubber consists of a packing column, a tray column, or a spray column alone or in combination, and liquid and chemicals are sprayed into the scrubber to contact gas, liquid, and chemicals entering the scrubber to thereby remove harmful substances.

Liquid flowing into the scrubber naturally descends due to gravity in a spray device, etc., and gas flowing into the scrubber rises and the liquid and the gas come into contact with each other. As described above, because harmful substances are removed in a contact state with liquid and chemicals, it is possible to efficiently remove harmful substances from gas when the contact efficiency between the gas and the liquid increases inside the scrubber.

However, conventional gas dispersion devices have the following problems. Recently, in order to efficiently use a scrubber installation space, scrubbers are often designed in a rectangular shape rather than a cylindrical shape. However, conventional gas dispersion devices have a problem in that the contact efficiency between gas and liquid decreases as a method used in designing cylindrical scrubbers is used as it is.

Specifically, conventional gas dispersion devices sprays gas along the circular circumferences thereof. When using such a gas dispersion device, when a gas inflow rate is low, the gas is less dispersed at the corners of a rectangular scrubber. When the gas inflow rate is high, the gas is excessively dispersed at the corners of the rectangular scrubber.

DISCLOSURE

Technical Problem

The present disclosure is to solve the problems described above, and more particularly, the present disclosure relates to a gas dispersion device capable of improving the performance of a rectangular scrubber, wherein the gas dispersion device is equipped with a gas inlet and a gas disperser and may spray gas in a rectangular shape inside a rectangular scrubber to improve the contact efficiency between gas and liquid, thereby efficiently removing harmful substances from the gas.

Technical Solution

A gas dispersion device capable of improving the performance of a rectangular scrubber to efficiently remove harmful substances from gas includes: a scrubber having a rectangular shape; and a gas inlet configured to introduce gas into the scrubber, the gas inlet being mounted on the scrubber and having a rectangular shape.

The gas dispersion device may further include a gas disperser, provided at a point where the gas inlet communicates with an internal space of the scrubber, having a rectangular plate shape and being configured to disperse the gas introduced from the gas inlet outward along its rectangular circumference.

The gas dispersion device may further include: a first gas disperser provided at a point where the gas inlet communicates with an internal space of the scrubber, the gas disperser having a rectangular plate shape, being configured to disperse the gas introduced from the gas inlet outward along its rectangular circumference, and having a through hole having a rectangular shape; and a second gas disperser provided above the through duct of the first gas disperser, the second gas disperser having a rectangular plate shape and being configured to disperse gas passing through the through hole outward along its rectangular circumference.

The gas dispersion device may further include a wing-type gas disperser provided at a point where the gas inlet communicates with an internal space of the scrubber, wherein the wing-type gas disperser may include: a base portion provided above the gas inlet and extending in a direction parallel to one side of the gas inlet while forming a groove; an extension portion extending from one side of the base portion and extending obliquely upward from an inside of the gas inlet portion toward an outside; and a wing portion extending horizontally from one side of the extension portion.

The wing portion may extend in a direction parallel to one side of the gas inlet while forming a certain width.

A plurality of wing-type gas dispersers may be provided, and gas may be moved between the plurality of wing-type gas dispersers.

The gas dispersion device may further include a cover portion disposed between two base portions and configured to cover a space between the two base portions, wherein the cover portion may include two coupling plates respectively coupled to the two base portions, and a cover plate coupled to the two coupling plates to cover a gap between the two coupling plates.

The gas inlet may be mounted on a lower portion of the scrubber or a side portion of the scrubber.

Advantageous Effects

The present disclosure relates to a gas dispersion device for improving the performance of a rectangular scrubber, and the gas dispersion device is equipped with a gas inlet and a gas disperser, which may spray gas in a rectangular shape inside a rectangular scrubber to improve contact efficiency between gas and liquid, thereby efficiently removing harmful substances from the gas.

MODE FOR INVENTION

The principles and embodiments of the disclosure will be described herein in order to clarify the scope of the disclosure and to enable those of ordinary skill in the art to embody and practice the disclosure. The presented embodiments may be implemented in various forms.

It will be understood that the terms "including," "having," and "comprising" used in various embodiments of the disclosure are intended to indicate the existence of the features, operations, or elements described in the disclosure, and are not intended to limit the existence of additional one or more features, operations, or elements. Also, it will be understood that the terms "including," "having," and "comprising" in various embodiments of the disclosure are intended to indicate the existence of features, numbers, steps, operations, elements, and parts, described in the specification, or combinations thereof, and are not intended to preclude the possibility that one or more other features, numbers, steps, operations, elements, and parts, or combinations thereof may exist or may be added.

It will be understood that, when an element is referred to as being "connected" or "coupled" to another element, it can be directly connected or coupled to the other element, or can be connected or coupled to the other element with intervening elements interposed therebetween. In contrast, it will be understood that, when an element is referred to as being "directly connected" or "directly coupled" to another element, there are no intervening elements interposed between the element and the other element.

It will be understood that although the terms "first", "second", etc. may be used herein to describe various elements, these elements should not be limited by these terms. These terms are used only to distinguish one element from another.

The present disclosure relates to a gas dispersion device for improving the performance of a rectangular scrubber, the gas dispersion device being equipped with a gas inlet and a gas disperser, which may spray gas in a rectangular shape inside a rectangular scrubber to improve contact efficiency between gas and liquid, thereby efficiently removing harmful substances from the gas. Hereinafter, preferred embodiments of the disclosure will be described in detail with reference to the accompanying drawings.

Figure 1:
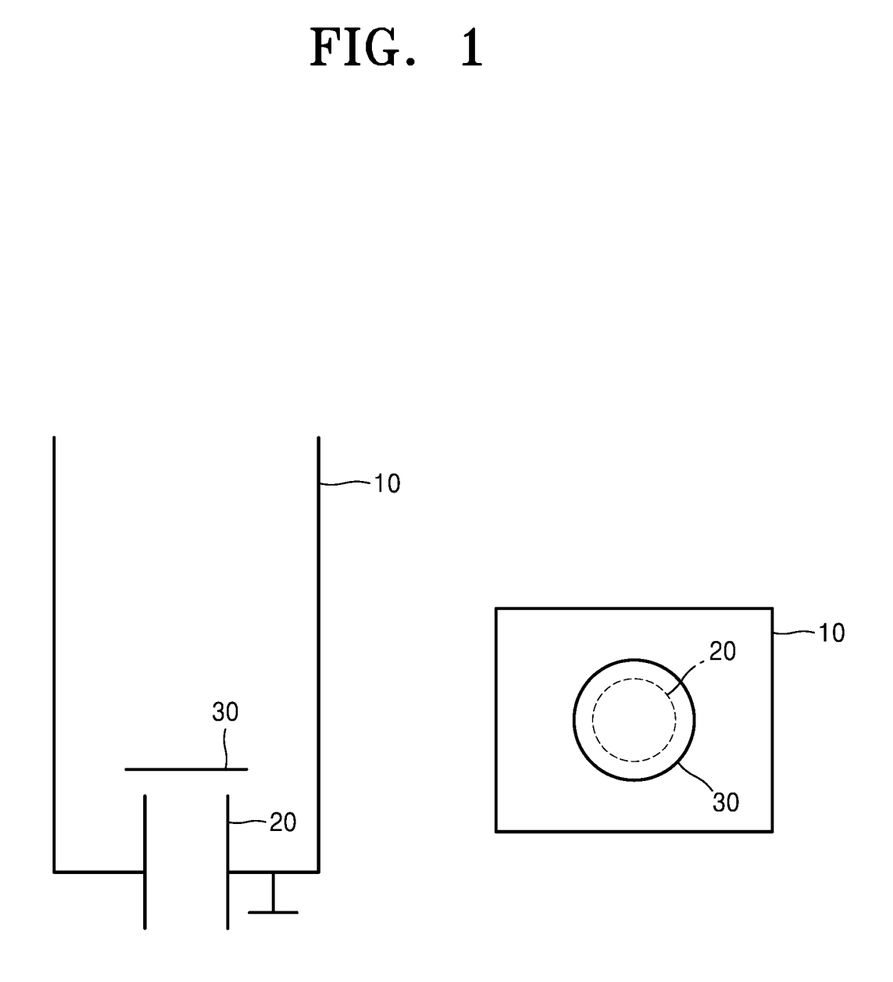
FIG. 1 is a cross-sectional view and a plan view showing an example in which a circular gas inlet and a circular gas disperser are provided in a rectangular scrubber.

FIG. 1 is a view showing an example in which a circular gas inlet 20 is mounted on a rectangular scrubber 10 and a circular gas disperser 30 is used. The circular gas inlet 20 and the circular gas disperser 30 disperse gas along a circular circumference, and the gas introduced through the circular gas inlet 20 is dispersed in a circular circumferential direction by the circular gas inlet 20 and the circular gas disperser 30.

However, when the circular gas disperser 30 is used in the rectangular scrubber 10, the following problems occur. The circular gas disperser 30 disperses the gas in a circular shape. When the moving speed of the gas introduced from the circular gas inlet 20 is low, the gas is less dispersed at the corners of the rectangular scrubber 10, and contact efficiency between liquid and gas is reduced at the corners of the rectangular scrubber 10. In addition, when the moving speed of the gas introduced from the circular gas inlet 20 is high, there is a problem in that the gas is excessively dispersed at the corners of the rectangular scrubber 10.

In other words, when the circular gas inlet 20 and the circular gas disperser 30 are used in the rectangular scrubber 10, contact efficiency between liquid and gas decreases as the shape of the scrubber differs from the shape of gas dispersion, and thus, harmful substances in the gas may not be efficiently removed.

Figure 2:
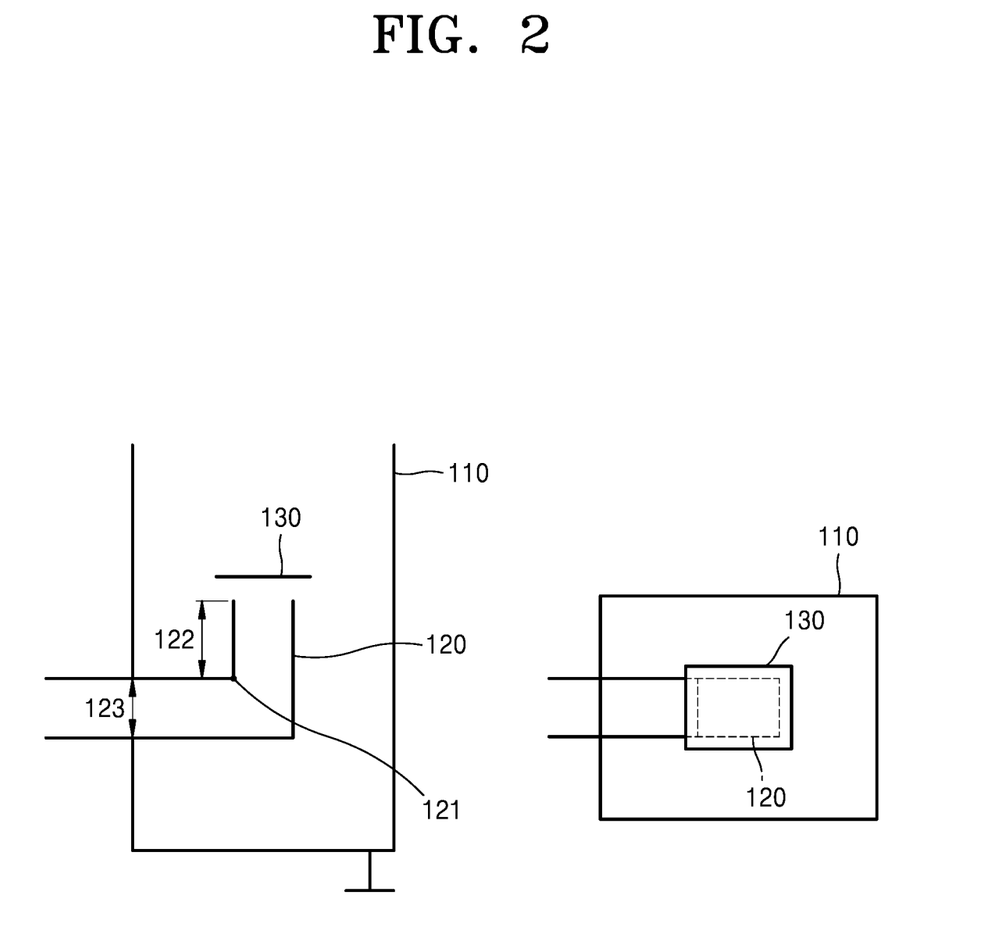
FIG. 2 is a cross-sectional view and a plan view showing an example in which a gas inlet having a rectangular shape is mounted on a side portion of a rectangular scrubber and a gas disperser having a rectangular plate shape is provided above the gas inlet, according to an embodiment of the present disclosure.
Figure 3:
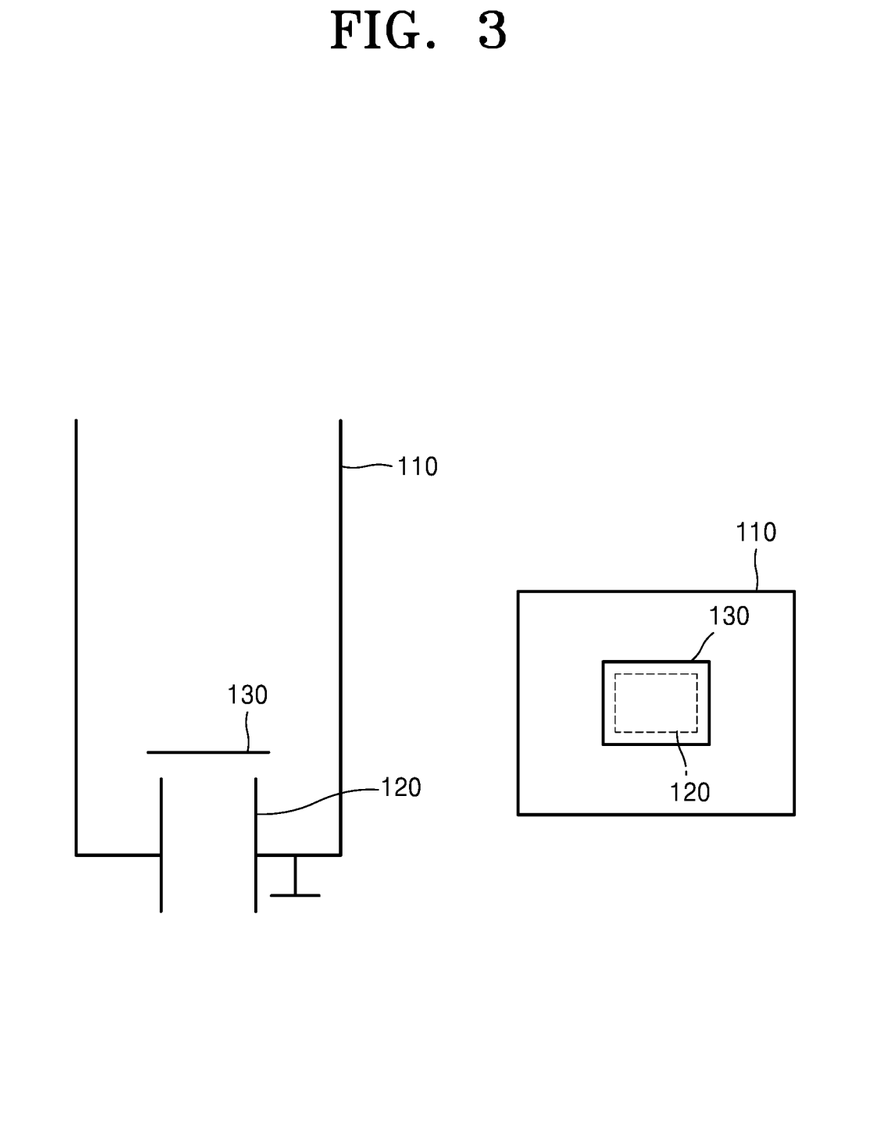
FIG. 3 is a cross-sectional view and a plan view showing an example in which a gas inlet having a rectangular shape is mounted on a lower portion of a rectangular scrubber and a gas disperser having a rectangular plate shape is provided above the gas inlet, according to an embodiment of the present disclosure.

A gas dispersion device for improving the performance of a rectangular scrubber according to an embodiment of the present disclosure is intended to solve this problem. Referring to FIGS. 2 and 3, a gas dispersion device for improving the performance of a rectangular scrubber according to an embodiment of the present disclosure includes a scrubber 110, a gas inlet 120, and a gas disperser 130.

Referring to FIGS. 2 and 3, the scrubber 110 has a rectangular shape and may be a column extending while forming a rectangular cross-section. While liquid is sprayed at the top of the scrubber 110, the liquid descends due to gravity, and while gas rises at the bottom of the scrubber 110, the gas and the liquid come into contact with each other.

As the gas and the liquid come into contact with each other, harmful substances in the gas may be removed, and when the contact efficiency between the gas and the liquid is improved, the harmful substances in the gas may be efficiently removed.

The gas inlet 120 is mounted on the scrubber 110, and gas may be introduced into the scrubber 110 through the gas inlet 120. The gas inlet 120 has a rectangular shape and may be a tube extending while forming a rectangular cross-section.

Here, the gas inlet 120 may be formed inside the scrubber 110, and the gas inlet 120 may introduce gas in a rectangular shape while forming a rectangular cross section inside the scrubber 110.

In other words, the gas inlet 120 may be a point where gas is introduced in a rectangular cross-section in the scrubber 110. A tube extending from the outside to the gas inlet 120 may be a rectangular tube, but if necessary, a circular tube may extend from the outside and then a tube of a rectangular shape may extend in the gas inlet 120.

As the gas inlet 120 has a rectangular shape and introduces gas into the scrubber 110, the contact efficiency between the gas and the liquid may be improved. As described above, when a circular gas inlet is mounted on the scrubber 110 having a rectangular shape, there is a problem in that less gas is dispersed or excessive gas is dispersed at the corners of the rectangular scrubber 110.

In the gas dispersion device for improving the performance of a rectangular scrubber according to an embodiment of the present disclosure, in order to solve this problem, the gas inlet 120 is formed in a rectangular shape having a rectangular cross-section and mounted on the scrubber 110.

As the gas inlet 120 having a rectangular shape is mounted on the scrubber 110 to supply gas in a rectangular shape, it is possible to prevent gas from being less dispersed or excessively dispersed at the corners of the rectangular scrubber 110.

Referring to FIGS. 2 and 3, the gas inlet 120 may be mounted on a lower portion of the scrubber 110 or a side portion of the scrubber 110. FIG. 2 shows an example in which the gas inlet 120 is mounted on a side portion of the scrubber 110, and FIG. 3 shows an example in which the gas inlet 120 is mounted on a lower portion of the scrubber 110.

In this way, if the gas inlet 120 may supply gas to the scrubber 110, the gas inlet 120 may be mounted on the lower portion or side portion of the scrubber 110. However, when the gas inlet 120 is mounted on the side portion of the scrubber 110, a bending portion may be formed at the gas inlet 120 to supply gas in an upper direction of the scrubber 110.

In this case, a distance 122 from the highest point 121 in an upper direction in the bending portion to a point where gas is introduced while the gas inlet 120 communicates with the inside of the scrubber 110 may be about 1.5 times to about 3 times a length 123 of a side of the gas inlet 120 in a vertical direction at a point where the side of the scrubber 110 and the gas inlet 120 meet.

When the distance 122 from the highest point 121 in an upper direction in the bending portion to the point where gas is introduced while the gas inlet 120 communicates with the inside of the scrubber 110 is less than 1.5 times the length 123 of a side of the gas inlet 120 in a vertical direction at the point where the side of the scrubber 110 and the gas inlet 120 meet, an advancing direction of the gas introduced from the side portion of the scrubber 110 is not completely converted to an upward direction, and accordingly, there is a risk that the gas is shifted and dispersed toward an advancing direction in which the gas is introduced from the side portion of the scrubber 100.

In addition, when the distance 122 from the highest point 121 in an upper direction in the bending portion to the point where gas is introduced while the gas inlet 120 communicates with the inside of the scrubber 110 is greater than 1.5 times the length 123 of a side of the gas inlet 120 in a vertical direction at the point where the side of the scrubber 110 and the gas inlet 120 meet, this may be uneconomical as a space where gas and liquid come into contact with each other inside the scrubber 110 is reduced.

Therefore, the distance 122 from the highest point 121 in an upper direction in the bending portion to the point where gas is introduced while the gas inlet 120 communicates with the inside of the scrubber 110 is preferably about 1.5 times to about 3 times the length 123 of a side of the gas inlet 120 in a vertical direction at the point where the side of the scrubber 110 and the gas inlet 120 meet.

After the gas inlet 120 is introduced from the side portion of the scrubber 110, the gas inlet 120 is bent in the upper direction of the scrubber 110, and thus, gas is supplied from the inside of the scrubber 110 in an upper direction of the scrubber 110.

The gas disperser 130 may be provided at a point where the gas inlet 120 communicates with an internal space of the scrubber 110, and may be located above the gas inlet 120.

When gas is introduced into the scrubber 110 through the gas inlet 120, it is necessary to prevent liquid from flowing into the gas inlet 120. Specifically, liquid descends from the top of the scrubber 110 and gas rises at the bottom of the scrubber 110. The gas may be smoothly supplied into the scrubber 110 through the gas inlet 120 when the liquid descending from the top of the scrubber 110 is prevented from flowing into the gas inlet 120.

The gas disperser 130 is provided for this purpose, and the gas disperser 130 may be provided above the gas inlet 120 and may prevent liquid from flowing into the gas inlet 120.

In addition, the gas may be efficiently dispersed into the scrubber 110 through the gas disperser 130. Referring to FIGS. 2 and 3, the gas disperser 130 may be formed in a rectangular plate shape. The gas disperser 130 may be formed of a rectangular plate having a width that is larger than that of the inlet of the gas inlet 120.

The gas disperser 130 may be installed to be apart from the inlet of the gas inlet 120, and thus, the gas introduced from the gas inlet 120 may be dispersed outward along the rectangular circumference of the gas disperser 130.

In other words, the gas may be dispersed in a rectangular shape inside the scrubber 110 through the gas disperser 130, thereby preventing the gas from being not dispersed or excessively dispersed at the corners of the scrubber 110.

Figure 4:
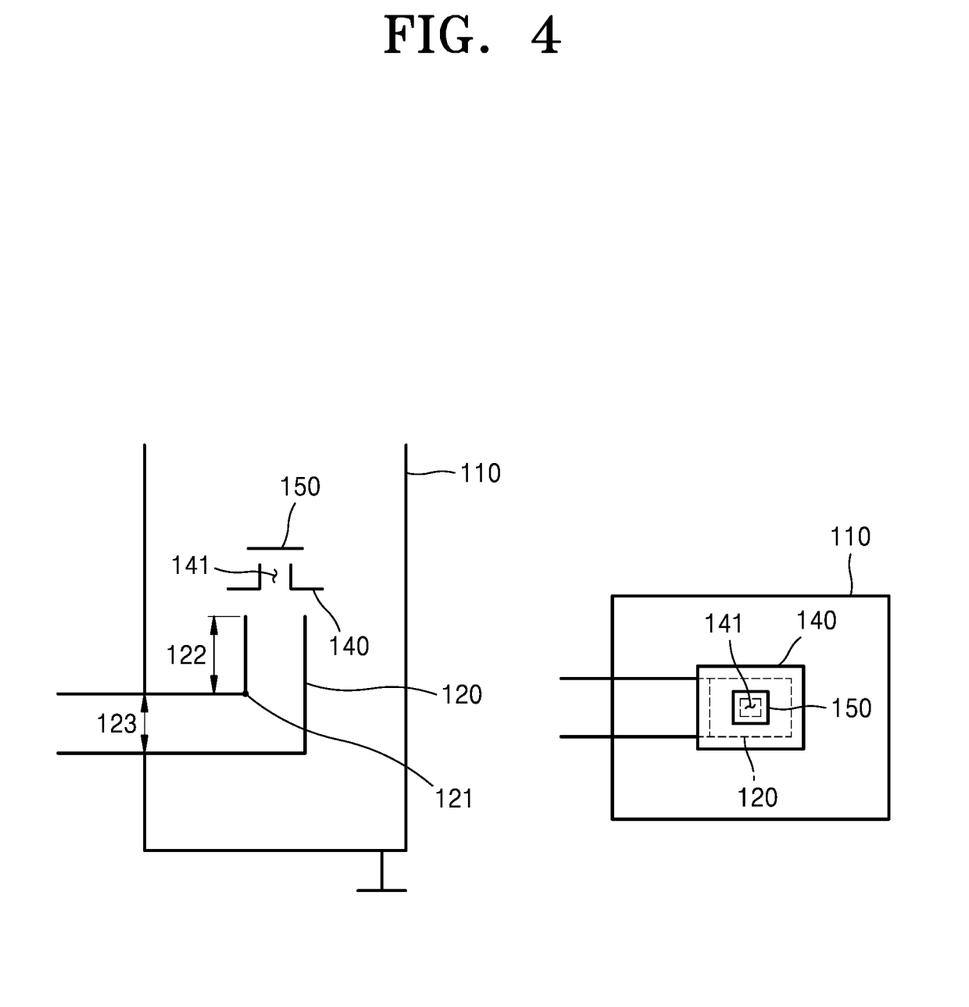
FIG. 4 is a cross-sectional view and a plan view showing an example in which a gas inlet having a rectangular shape is mounted on a side portion of a rectangular scrubber and first and second gas dispersers each having a rectangular plate shape are provided above the gas inlet, according to an embodiment of the present disclosure.
Figure 5:
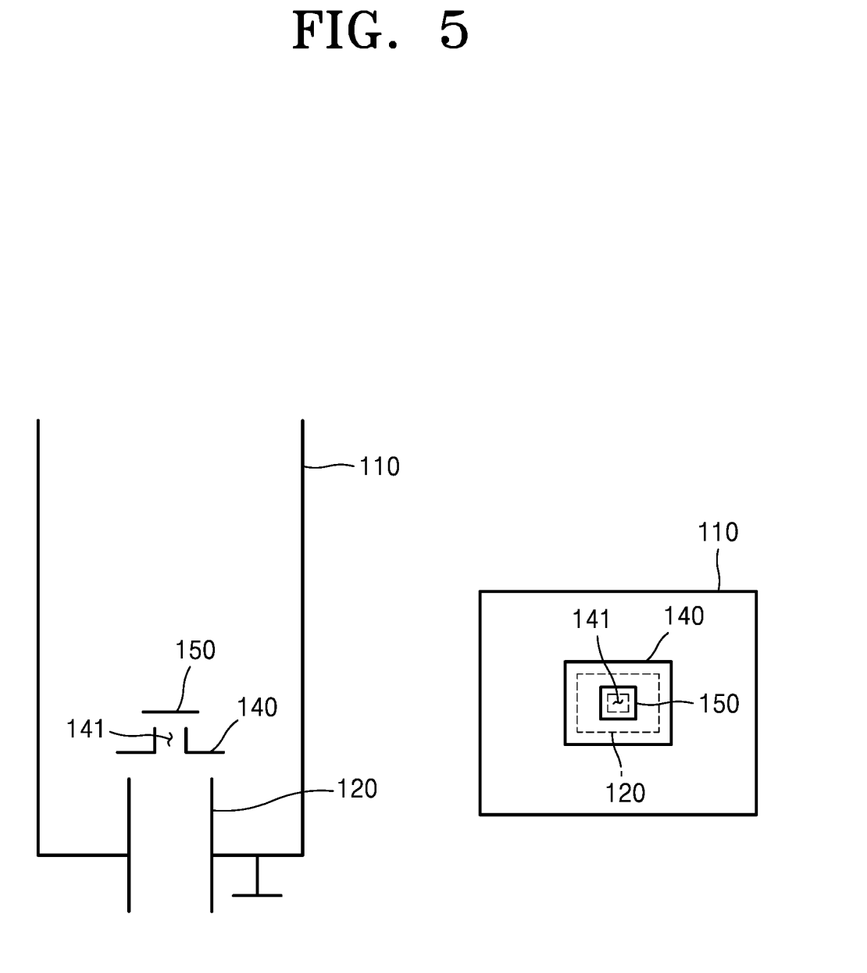
FIG. 5 is a cross-sectional view and a plan view showing an example in which a gas inlet having a rectangular shape is mounted on a lower portion of a rectangular scrubber and first and second gas dispersers each having a rectangular plate shape are provided above the gas inlet, according to an embodiment of the present disclosure.

Referring to FIGS. 4 and 5, the gas disperser 130 may form a plurality of layers and may include a first gas disperser 140 and a second gas disperser 150.

FIG. 4 is a view showing an example in which the first gas disperser 140 and the second gas disperser 150 are provided when the gas inlet 120 is mounted on a side portion of the scrubber 110, and FIG. 5 is a view showing an example in which the first gas disperser 140 and the second gas disperser 150 are provided when the gas inlet 120 is mounted on a lower portion of the scrubber 110.

The first gas disperser 140 is provided at a point where the gas inlet 120 communicates with an internal space of the scrubber 110, and may be formed in a rectangular plate shape and have a through hole 141 having a rectangular shape therein.

The first gas disperser 140 may be installed apart from the inlet of the gas inlet 120, and the gas introduced from the gas inlet 120 may be dispersed outward along the rectangular circumference of the first gas distributor 140.

Some of the gas introduced from the gas inlet 120 may pass through the through hole 141 of the first gas disperser 140. The second gas disperser 150 is provided above the through hole 141 of the first gas disperser 140, and may be formed in a rectangular plate shape and disperse the gas passing through the through hole 141 outward along the rectangular circumference.

The second gas disperser 150 may be formed of a rectangular plate having a width that is larger than that of the through hole 141 and may be installed apart from the through hole 141, and the gas passing through the through hole 141 may be dispersed to the outside along the rectangular circumference of the second gas disperser 150.

In this way, as the first gas disperser 140 and the second gas disperser 150 are provided in a layered shape, the gas introduced from the gas inlet 120 may be more efficiently dispersed into the scrubber 110.

The first gas disperser 140 may be installed in various ways as long as the first gas disperser 140 covers the gas inlet 120 and is installed apart from the inlet of the gas inlet 120. The first gas disperser 140 may be connected to the gas inlet 120 or the scrubber 110 through a separate member, or may be connected to other components through a separate member.

The second gas disperser 150 may be installed in various ways as long as the second gas disperser 150 covers the through hole 141 and is installed apart from the through hole 141. The second gas disperser 150 may be connected to the gas inlet 120, the scrubber 110, or the first gas disperser 140 through a separate member, or may be connected to other components through a separate member.

The gas disperser 130 has been described as including the first gas disperser 140 and the second gas disperser 150, but is not limited thereto. A third gas disperser and a fourth gas disperser may be provided in a way that is the same as the way in which the second gas disperser 150 is provided above the first gas disperser 140.

Figure 6:
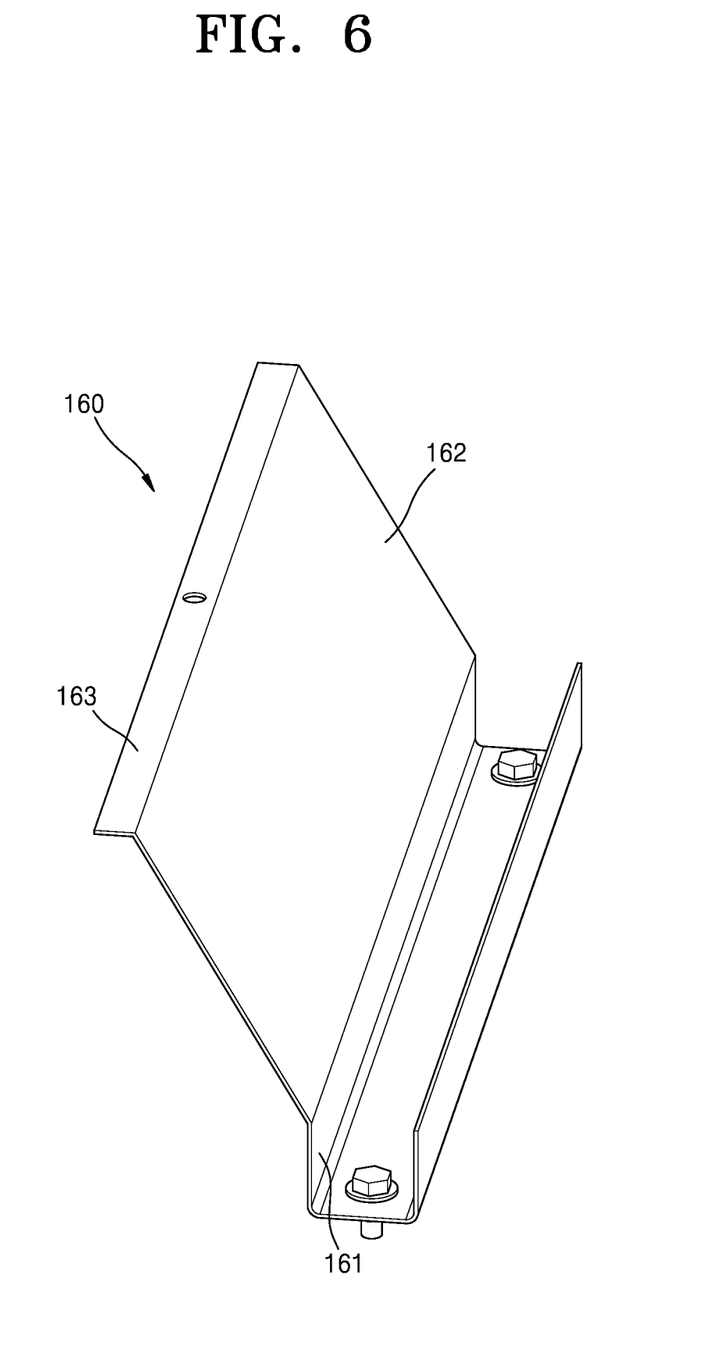
FIG. 6 is a view showing a wing-type gas disperser according to an embodiment of the present invention.
Figure 7:
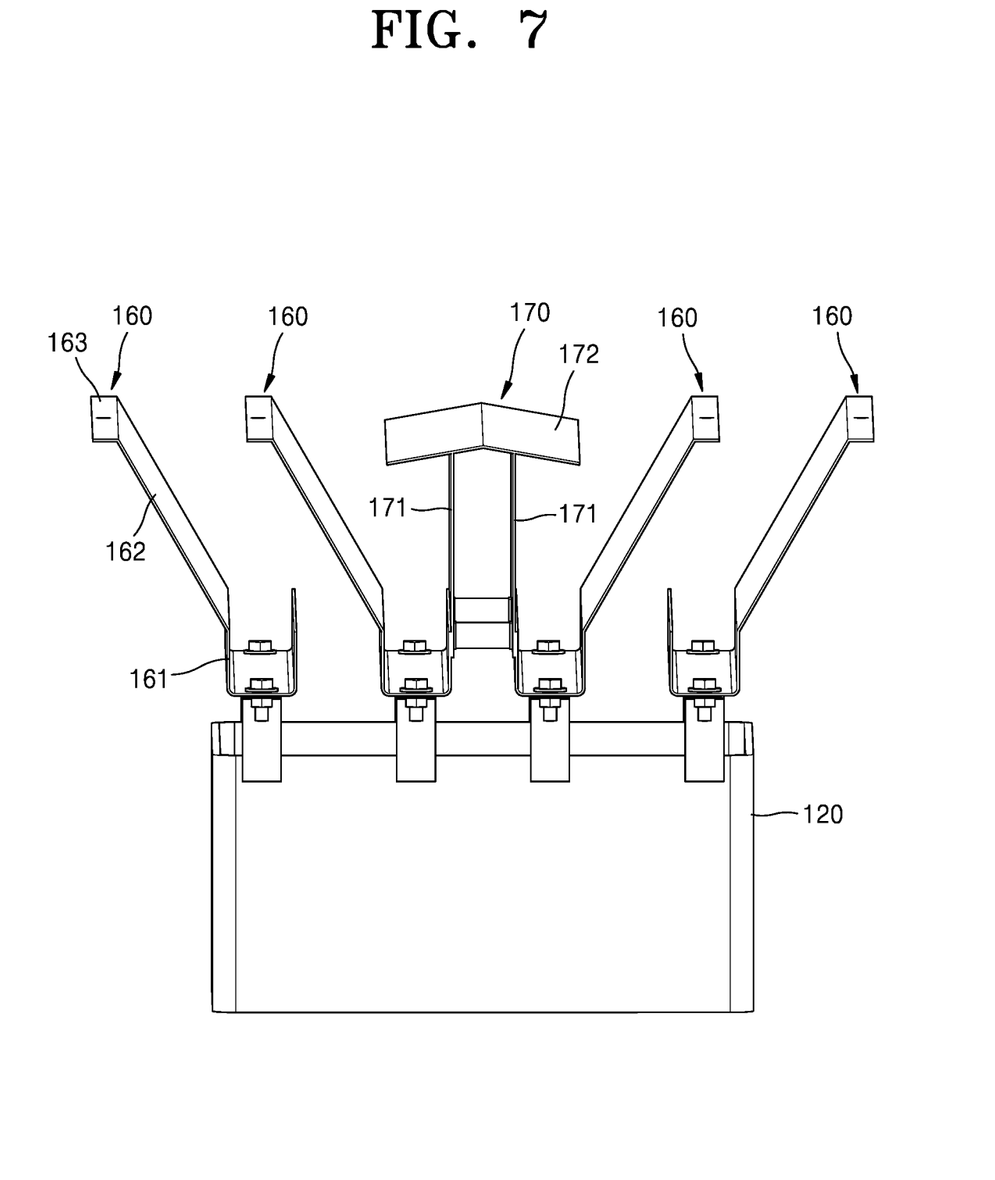
FIG. 7 is a front view showing an example in which a plurality of wing-type gas dispersers are provided above a gas inlet, according to an embodiment of the present invention.
Figure 8:
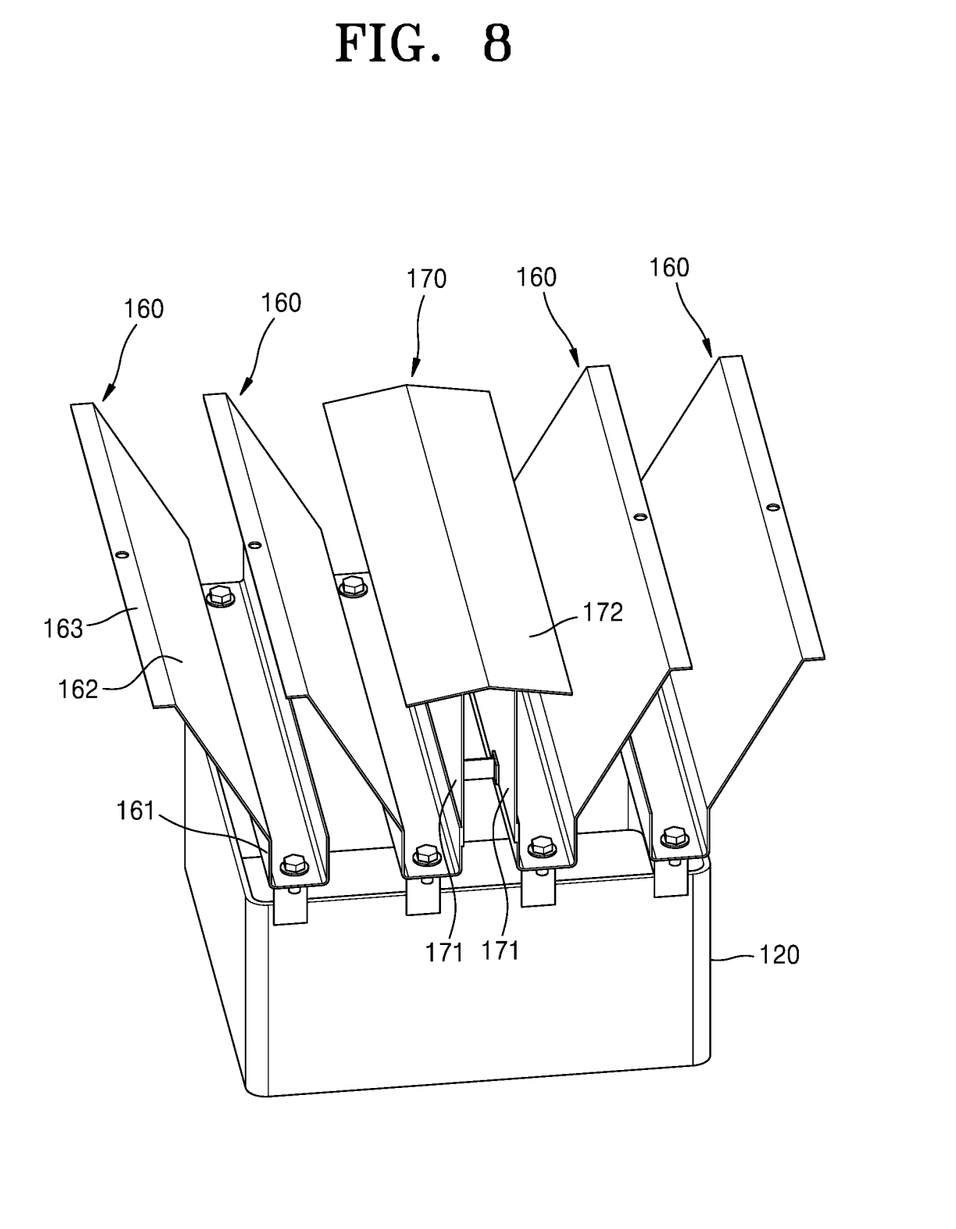
FIG. 8 is a perspective view showing an example in which a plurality of wing-type gas dispersers are provided above a gas inlet, according to an embodiment of the present invention.

The gas disperser 130 according to an embodiment of the present disclosure may have a shape other than a rectangular plate shape. Referring to FIGS. 6 to 8, the gas dispersion device for improving the performance of a rectangular scrubber according to an embodiment of the present disclosure may include a wing-type gas disperser 160.

The wing-type gas disperser 160 is provided at a point where the gas inlet 120 communicates with the internal space of the scrubber 110, and includes a base portion 161, an extension portion 162, and a wing portion 163.

Referring to FIGS. 6 and 7, the base portion 161 extends in a direction parallel to one side of the gas inlet 120 while forming a groove. As described above, the gas inlet 120 may be formed in a rectangular shape, and the base portion 161 has a groove and extends in a direction parallel to one of the four sides of the gas inlet 120.

The base portion 161 may form a groove while having a '⊏'-shaped cross-section. However, the present disclosure is not limited thereto, and the base portion 161 may be formed in various shapes as long as the base portion 161 may form a groove. For example, the base portion 161 may have a U-shaped or V-shaped cross-section. Hereinafter, a case in which the base portion 161 has a '⊏'-shaped cross-section will be mainly described.

As shown in FIG. 7, the base portion 161 having a '⊏'-shaped cross-section may be arranged such that an open portion faces an upper portion of the scrubber 110 and a closed portion faces the inlet of the gas inlet 120. The base portion 161 prevents liquid from flowing into the gas inlet 120.

The extension portion 162 extends from one side of the base portion 161 and extends obliquely upward from the inside of the gas inlet 120 to the outside. The extension portion 162 is formed in a plate shape and may extend obliquely upward from one side of the base portion 161.

As shown in FIGS. 7 and 8, the extension portion 162 extends obliquely upward from the inside of the gas inlet 120 to the outside, and the extension portion 162 serves to guide gas introduced from the gas inlet 120 and serves to prevent liquid from entering the gas inlet 120.

The wing portion 163 extends horizontally from one side of the extension portion 162. The wing portion 163 may be formed in a plate shape, and may extend in a direction parallel to one side of the gas inlet 120 while forming a certain width. The wing portion 163 serves to disperse gas between wings and serves to prevent liquid from entering the gas inlet 120.

Referring to FIGS. 7 and 8, a plurality of wing-type gas dispersers 160 may be provided, and gas may be moved between the plurality of wing-type gas dispersers 160. The plurality of wing-type gas dispersers 160 may be installed in the following manner.

In order to install the plurality of wing-type gas dispersers 160 above the gas inlet 120, a plurality of base portions 161 are installed above the gas inlet 120 and apart from each other.

In this case, as shown in FIG. 7, the base portion 161 having a '⊏'-shaped cross-section may be arranged such that an open portion faces an upper portion of the scrubber 110 and a closed portion faces the inlet of the gas inlet 120.

When the plurality of base portions 161 are apart from each other and installed in the gas inlet 120, gas is discharged through a gap between the base portions 161, and the discharged gas is dispersed while moving along the extension portion 162.

The wing-type gas disperser 160 extends in a direction parallel to one side of the gas inlet 120 in accordance with the shape of the gas inlet 120 having a rectangular shape, and thus may disperse the gas throughout the inside of the scrubber 110 having a rectangular shape.

According to an embodiment of the present disclosure, as the extension portion 162 extends obliquely upward from one side of the base portion 161 and the wing portion 163 extends in a horizontal direction from one side of the extension portion 162, liquid may be prevented from flowing into a gap between the base portions 161, through which gas is discharged.

Specifically, the extension portion 162 and the wing portion 163 may cover the gap between the base portions 161 and prevent liquid from flowing into the gap between the base portions 161. (Liquid falling into the extension portion 162 is collected in the base portion 161 having a '⊏'-shaped cross-section (a groove) while moving along the extension portion 162, and the liquid is prevented from flowing into the gap between the base portions 161.)

Here, a horizontal distance from one side of the base portion 161 to the end of the wing portion 163 may be greater than the interval between the plurality of base portions 161. When the horizontal distance from one side of the base portion 161 to the end of the wing portion 163 is less than the interval between the plurality of base portions 161, there is a risk that a gap may be generated and liquid may flow into the gap between the base portions 161.

Therefore, in order to prevent liquid from flowing into the gap between the base portions 161 through the extension portion 162 and the wing portion 163, the horizontal distance from one side of the base portion 161 to the end of the wing portion 163 is preferably greater than the interval between the plurality of base portions 161.

The wing-type gas disperser 160 according to an embodiment of the present disclosure may be installed in various ways as long as the wing-type gas disperser 160 covers the gas inlet 120 and forms a passage through which the gas discharged from the gas inlet 120 moves. The wing-type gas disperser 160 may be connected to the gas inlet 120 or the scrubber 110 through a separate member, or may be connected to other components through a separate member.

The gas dispersion device for improving the performance of a rectangular scrubber according to an embodiment of the present disclosure may further include a cover portion 170 that is disposed between two base portions 161 and may cover a space between the two base portions 161.

When the plurality of wing-type gas dispersers 160 are installed in the gas inlet 120, the extension portion 162 of each of the wing-type gas dispersers 160 is installed to extend upward from the inside of the gas inlet part 120 toward the outside.

When the plurality of wing-type gas dispersers 160 are installed in this way, a gap between two base portions 161 at the center of the gas inlet 120 may not be covered, as shown in FIGS. 7 and 8.

The cover portion 170 is provided to solve this problem and may cover the gap between the two base portions 161 at the center of the gas inlet 120.

The cover portion 170 may include two coupling plates 171 respectively coupled to the two base portions 161, and a cover plate 172 coupled to the two coupling plates 171 to cover a gap between the two coupling plates 171.

The coupling plates 171 are respectively coupled to the two base portions 161 and extend upward, and the cover plate 172 may cover the gap between the two base portions 161 at the center of the gas inlet 120 while covering the gap between the two coupling plates 171.

Here, the width of the cover plate 172 may be greater than the gap between the two base portions 161 disposed in the center, and thus, fluid may be prevented from flowing into the gap between the two base portions 161.

The cover portion 170 may be installed in various ways as long as the cover portion 170 covers the gap between the two base portions 161 disposed at the center of the gas inlet 120. The cover portion 170 may be connected to the gas inlet 120, the scrubber 110, or the wing-type gas disperser 160 through a separate member, or may be connected to other components through a separate member.

As described above, the gas dispersion device for improving the performance of a rectangular scrubber according to an embodiment of the present disclosure includes a gas inlet formed in a rectangular shape and mounted inside a scrubber formed in a rectangular shape, and a gas disperser capable of spraying gas outward along the rectangular circumference thereof, the gas disperser being mounted above the gas inlet.

Accordingly, the gas dispersion device for improving the performance of a rectangular scrubber according to an embodiment of the present disclosure may efficiently remove harmful substances from gas by improving contact efficiency between gas and liquid.

In particular, the gas dispersion device for improving the performance of a rectangular scrubber according to an embodiment of the present disclosure may improve contact efficiency between gas and liquid while preventing gas from being not dispersed or excessively dispersed at the corners of the rectangular scrubber by using a gas inlet formed in a rectangular shape and a gas disperser capable of spraying gas outward along the rectangular circumference thereof, the gas disperser being mounted above the gas inlet.

As such, although the present disclosure has been particularly shown and described with reference to embodiments shown in the drawings, it will be understood by one of ordinary skill in the art that various changes in form and details may be made therein without departing from the spirit and scope of the present disclosure as defined by the appended claims. Therefore, the scope of the present disclosure is defined not by the detailed description of the present disclosure but by the appended claims, and all differences within the scope will be construed as being included in the present disclosure.

The invention claimed is:

1. A gas dispersion device for improving a performance of a rectangular scrubber to efficiently remove harmful substances from gas, the gas dispersion device comprising:
   a scrubber having a rectangular shape;
   a gas inlet configured to introduce gas into the scrubber, the gas inlet being mounted on the scrubber and having a rectangular shape;
   a first gas disperser, having a rectangular plate shape and a through hole having a rectangular shape, disposed at a point where the gas inlet communicates with an internal space of the scrubber, the first gas disperser configured to disperse the gas introduced from the gas inlet outward along a rectangular circumference of the first gas disperser; and
   a second gas disperser, having a rectangular plate shape, disposed above the through hole of the first gas disperser, the second gas disperser configured to disperse gas passing through the through hole outward along a rectangular circumference of the second gas disperser.

2. The gas dispersion device of claim 1, further comprising a wing-type gas disperser provided at a point where the gas inlet communicates with the internal space of the scrubber,
   wherein the wing-type gas disperser includes:
   a base portion provided above the gas inlet and extending in a direction parallel to one side of the gas inlet while forming a groove;
   an extension portion extending from one side of the base portion and extending obliquely upward from an inside of the gas inlet toward an outside; and
   a wing portion extending horizontally from one side of the extension portion.

3. The gas dispersion device of claim 2, wherein the wing portion extends in a direction parallel to the one side of the gas inlet while having a predetermined width.

4. The gas dispersion device of claim 2, wherein the wing-type gas disperser includes a plurality of wing-type gas dispersers, and the gas is moved between the plurality of wing-type gas dispersers.

5. The gas dispersion device of claim 4, further comprising a cover portion disposed between two base portions and configured to cover a space between the two base portions,
   wherein the cover portion includes two coupling plates respectively coupled to the two base portions, and a cover plate coupled to the two coupling plates configured to cover a gap between the two coupling plates.

6. The gas dispersion device of claim 1, wherein the gas inlet is disposed on a lower portion of the scrubber or a side portion of the scrubber.

7. A gas dispersion device for improving a performance of a rectangular scrubber to efficiently remove harmful substances from gas, the gas dispersion device comprising:
   a scrubber having a rectangular shape;
   a gas inlet configured to introduce gas into the scrubber, the gas inlet being disposed on the scrubber and having a rectangular shape; and
   a wing-type gas disperser disposed at a point where the gas inlet communicates with an internal space of the scrubber, the wing-type gas disperser having:
   a base portion disposed above the gas inlet and extending in a direction parallel to one side of the gas inlet while forming a groove,
   an extension portion extending from one side of the base portion and extending obliquely upward from an inside of the gas inlet toward an outside, and a wing portion extending horizontally from one side of the extension portion.

\* \* \* \* \*